Aug. 16, 1938.   G. A. GLEASON   2,126,955
FLEXIBLE CONDUIT
Filed April 19, 1935
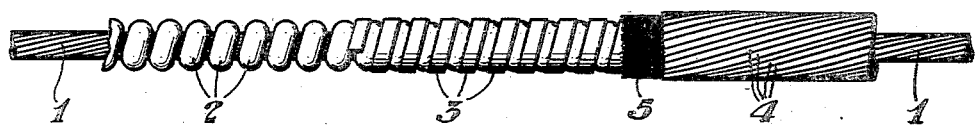
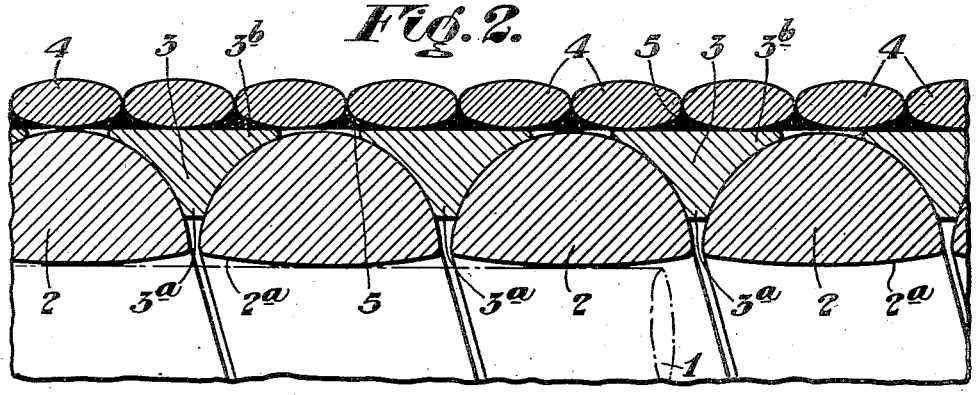
Inventor:
GEORGE A. GLEASON,
by: Usina & Hauber
his Attorneys.

Patented Aug. 16, 1938

2,126,955

UNITED STATES PATENT OFFICE 2,126,955

FLEXIBLE CONDUIT

George A. Gleason, Worcester, Mass., assignor to The American Steel and Wire Company of New Jersey, a corporation of New Jersey Application April 19, 1935, Serial No. 17,325

3 Claims. (Cl. 64—3)

This invention is an improved form of flexible conduit of the type frequently used to carry the operating cables of automobile brakes.

This conduit consists of a short-pitched helical coil of half-round wire having its normally flat face inside and upset so that it is appreciably convex, T-wire wound over this coil with its stem portion forced inwardly between the convolutions of the half-round wire to an extent sufficient to at least slightly separate the same but insufficient to become flush with their inside faces and with its head portion extending at least slightly above the outer faces of these convolutions, wires tightly wound with a relatively long-pitched lay over the T-wire so as to contact the latter's head portions and continuously force the T-wire to maintain its relationship with the half-round wire and cord packing which is laid between the T-wire and the last mentioned wires so as to fill the interstices between the latter.

The above conduit is illustrated by the accompanying drawing, in which:

Figure 1 shows the conduit broken away so as to illustrate its component parts;

Figure 2 shows the specific relationship of the parts by means of an enlarged longitudinal section.

Referring more particularly to this drawing:

Figures 1 and 2 illustrate a cable 1 carried by the conduit consisting of the short-pitched helical coil of half-round wire 2 having its normally flat face 2ª inside and upset so that it is appreciably convex. This convexity may be secured during the coiling operation providing the half-round wire 2 is of sufficiently large dimensions as compared to the diameter of the helix into which it is formed. The convex faces thus provided are of great advantage in that they materially reduce wear on the cable 1 by reducing the friction between the parts and by preventing the sharp edges of the half-round wire from exerting any cutting action.

The T-wire 3 is wound over the coil of half-round wire 2 with its stem portion 3ª forced inwardly between the convolutions of the latter to an extent sufficient to at least slightly separate the same but insufficient to itself become flush with their inside faces 2ª. This separation of the convolutions provides an internal helical groove for the conduit, which functions as a grease retainer from which grease may be distributed to the cable 1 during the latter's reciprocating action. Furthermore, any flexing of the conduit tends to close this groove at one point or another whereby any grease in the same is extruded onto the cable. It is also to be noted that the head portion 3ᵇ of the T-wire 3 extends at least slightly above the outer faces of the convolutions of the half-round wire.

The outermost layer of the conduit consists of the plurality of wires 4 which are tightly wound with a relatively long-pitched lay over the T-wire 3 so as to contact the latter's head portion 3ᵇ and so as to continuously force the T-wire to maintain its relationship with the half-round wire. The cord packing 5 is laid between the T-wire 3 and the wires 4 so as to fill the interstices between the latter. Any tendency of the half-round wire 2 or T-wire 3 to open up due to their short-pitched helical form is prevented or retarded by these wires 4 due to their relatively long pitch. Furthermore, these wires 4 function to greatly increase the tensile strength of the conduit as a whole. They also function to continuously force the T-wire 3 into place so that no openings will occur when the conduit is arced, this action being particularly effective due to the fact that the head portions 3ᵇ of the T-wire 3 extends slightly above the outer faces of the convolutions of the half-round wire 2. Since this will in many cases make the conduit entirely grease-tight, it will be possible to entirely eliminate the cord packing 5 in many instances. Then too, these wires 4 may be rust-proofed by galvanizing or the like, or they may be made of rust-resisting steel, whereby it will not be necessary to paint or otherwise protect the conduit against rust.

All of the wires are preferably made of high-carbon or other hard steel. This reduces the wear on the half-round wire 2 and renders the T-wire 3 sufficiently rigid to prevent any shortening of the conduit. The long pitch of the wires 4 effectively dampens the conduit so as to greatly retard any crystallization which might result from vibration.

I claim:

1. A flexible conduit including a short-pitched helical coil of half-round wire having its flat face inside, T-wire wound over said coil with its stem portion extending inwardly between the convolutions of said half-round wire and its head portion extending at least slightly above said convolutions and wires tightly laid with a relatively long pitch over said T-wire so as to contact said head portion and continuously force said T-wire inwardly.

2. A flexible conduit including half-round wire of such dimensions and coiled into a helix of such diameter, with its normally flat face inside, as to cause said face to be upset into a convex face, T-wire wound over said helix with its stem portion extending inwardly between the convolutions of said half-round wire and its head portion extending at least slightly above the outsides of said convolutions and wire wound over said convolutions of the head portion of said T-wire so as to apply pressure to the same.

3. A flexible conduit including half-round wire of such dimensions and coiled into a helix of such diameter, with its normally flat face inside, as to cause said face to be upset into a convex face, T-wire wound over said helix with its stem portion extending inwardly between the convolutions of said half-round wire and its head portion extending at least slightly above the outsides of said convolutions and wire wound over said convolutions of the head portion of said T-wire so as to apply pressure to the same, the last named wire having a longer pitch than said half-round wire and said T-wire whereby it crosses the latter at an angle.

GEORGE A. GLEASON.